(12) United States Patent
Shirokov et al.

(10) Patent No.: US 11,196,254 B2
(45) Date of Patent: Dec. 7, 2021

(54) MULTI-SLOPE DROOP CONTROL

(71) Applicant: ROLLS-ROYCE plc, London (GB)

(72) Inventors: Vladimir A. Shirokov, Derby (GB); Zafer Jarrah, Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 16/916,841

(22) Filed: Jun. 30, 2020

(65) Prior Publication Data
US 2021/0004029 A1 Jan. 7, 2021

(30) Foreign Application Priority Data

Jul. 5, 2019 (GB) ...................................... 1909684

(51) Int. Cl.
*H02J 1/10* (2006.01)
*B63H 21/17* (2006.01)
*B64D 41/00* (2006.01)
*G05F 1/46* (2006.01)
(Continued)

(52) U.S. Cl.
CPC .............. *H02J 1/106* (2020.01); *B63H 21/17* (2013.01); *B64D 41/00* (2013.01); *G05F 1/46* (2013.01); *H02J 1/00* (2013.01); *H02J 1/102* (2013.01); *H02J 1/12* (2013.01); *B64D 2221/00* (2013.01)

(58) Field of Classification Search
CPC ... H02J 1/102; H02J 1/106; H02J 1/12; B64D 2221/00; B64D 41/00; G05F 1/46; G05F 1/62; H02M 3/1584; H02M 3/158; H02M 7/493; H02M 1/0025; H02M 1/0029; H02M 1/0003
See application file for complete search history.

(56) References Cited

U.S. PATENT DOCUMENTS

2017/0110880 A1* 4/2017 Chen ..................... H02M 7/493

FOREIGN PATENT DOCUMENTS

CN 107104427 8/2017
CN 107104427 A * 8/2017

OTHER PUBLICATIONS

Hailu, Tsegay, and J. A. Ferreira. "Piece-wise linear droop control for load sharing in low voltage DC distribution grid." 2017 IEEE Southern Power Electronics Conference (SPEC). IEEE, 2017. (Year: 2017).*

(Continued)

*Primary Examiner* — Ryan Johnson
(74) *Attorney, Agent, or Firm* — Shumaker & Sieffert, P.A.

(57) ABSTRACT

A method of controlling two or more sources of electrical power to supply electrical power to a shared bus. Each source of electrical power has a rated power $P_r$, a maximum overload power $P_m$, and is operable along a multi-voltage droop slope, the multi-voltage droop slope including a share region and a catch region, the share region being defined by an upper voltage limit, $V_{high}$ and a base voltage $V_{base}$, and the catch region being defined by the base voltage $V_{base}$ and a lower voltage limit $V_{low}$.

13 Claims, 3 Drawing Sheets

(51) Int. Cl.
    *H02J 1/00*     (2006.01)
    *H02J 1/12*     (2006.01)

(56) References Cited

OTHER PUBLICATIONS

Prabhakaran, Prajof, et al., "Novel Nonlinear Droop Control Techniques to Overcome the Load Sharing and Voltage Regulation Issues in DC Microgrid", IEEE Transactions on Power Electronics, vol. 3, No. 5, May 1, 2018 (May 1,2018), pp. 4477-4487.
European search report dated Sep. 21, 2020, issued in EP Patent Application No. 20183022.
Great Britain search report dated Dec. 23, 2019, issued in GB Patent Application No. 1909684.1.
Response to Extended European Search Report from counterpart EP Application 20183022.1 dated Sep. 29, 2020, filed Feb. 19, 2021, 30 pgs.

\* cited by examiner

MULTI-SLOPE DROOP CONTROL

CROSS-REFERENCE TO RELATED APPLICATIONS

This specification is based upon and claims the benefit of UK Patent Application No. GB1909684.1, filed on 5 Jul. 2019, which is hereby incorporated by reference herein in its entirety.

BACKGROUND

Technical Field

The present disclosure relates to a method of controlling two or more sources of electrical power.

Description of the Related Art

Control algorithms have been used in the context of electrical power generation and distribution for some time. A particularly important control algorithm is that which regulates the voltage on a bus, where multiple sources provide electrical power to the bus, and also regulates the power contribution share of each source to the total load demand. This is better done without a master slave configuration, due to the master being a single point of failure.

Droop control is one such control algorithm. The principle of droop control is that a reference is adjusted not only with the baseline reference, but also with a scaled subtraction of a plant or electrical source process variable. The most common example is droop speed control.

Droop control has also been applied to the DC bus voltages. FIG. 1 shows a control scheme implementing this principle. The DC voltage ("V DC") is the manipulated variable, DC voltage ("V DC") and current ("I DC") are the process variables, where "I DC" is used for droop feedback, "V (PWM)" is shown as the state variable, the controller is the power electronics controller, and Plant is an electrical source of power (motor/generator/energy storage etc.). "V DC high ref" is the DC voltage reference supplied externally, from it a scaled process variable "I DC" is subtracted, scaled by a scaling factor "K" to form the voltage reference "V DC ref" for the inner voltage control loop.

The droop control principle relies on the following:
(i) When sources are connected in parallel with each other and parallel to the load, Kirchhoff's laws apply:
　a. Voltage across each source is the same and is equal to the voltage across the load; and
　b. The load current equals the sum of all source currents.
(ii) For each source, the scaling parameter "K" defines a droop slope, where "V DC ref" droops or falls from "V DC ref high", depending on the amount of current "I DC" that the source is supplying. This relationship can be drawn as a line where "V DC ref" is on the y-axis, and either DC power or "I DC" is on the x-axis.
(iii) For any number of sources, there is an equilibrium the system will find, where all sources are at the same V (i.e. their "V DC ref" is the same) and the sum of their output currents equals the load current (i.e. abide to Kirchhoff's law).

Considering n sources in parallel, each having the same "V DC ref high", the contribution of each source can be controlled by manipulating the droop slope for each source through its respective gain $K_i$ with i being an integer from 1 to n, Having multiple sources under DC voltage droop control allows regulation of the DC bus voltage within a voltage droop band, i.e. the voltage is allowed to be anywhere between $V_{high}$ (referred to as "V DC high ref" above) and a minimum voltage $V_{low}$ where $I_{DC}$ is the maximum allowed source current, which can be referred to as the rated current $I_r$.

The slopes are generally adjusted depending on:
(i) User requirement;
(ii) Source capability;
(iii) Load demand.

Generally a higher level (and therefore slower) supervisory control system will be adjusting the $K_i$ slope parameters defining the power contributions of each source, however, when the percentage contribution of each source needs to be varied 'online' i.e. during power supply operations a fast response mechanism needs to be implemented.

An issue may arise when transients need to be handled. For example, consider two sources: A and B, each capable of providing 100 kW of DC power. Source A has its K parameter set such as to provide full rated power at $V_{low}$, whereas source B has its K parameter set such as to provide half its rated power at $V_{low}$. This means that source A will always provide double the power that B is providing, and for any particular load ⅔ of the power supply will come from A and ⅓ from B, or a 66.7:33.3 split between A and B.

The maximum load the system can deliver at this power supply split would be 150 kW i.e. full A and half B. However, if the demand is changed to 200 kW (the full rated power of A and B together), the K value of B will need to be adjusted to supply 100% power at $V_{low}$, i.e. a 50:50 split would be needed.

The change in demand (at the consumer end) can happen instantaneously. A transient overload would push A over its capability. The overload time would be dependent on the response time of the slower supervisory control system updating the K value for at least B. This delay, especially in cases where demand can instantaneously change to values significantly larger than the electrical power the weakest power source on the network is capable of supplying, present a significant risk of hardware damage and/or loss of voltage control/quality, and or network brownouts/blackouts.

To take an example, if a pilot applies a conventional aircraft electrical load such as a 20 kW radar whilst the electrical bus loading was 140 kW with the power split discussed above. The new bus load would be 160 kW, which is greater than the configured 150 kW generation capacity, risking an electrical brownout event due to the bus voltage collapse or an overcurrent trip event.

SUMMARY

Accordingly, in a first aspect, embodiments of the present disclosure provide a method of controlling two or more sources of electrical power to supply electrical power to a shared bus for provision to an electrical load wherein each source of electrical power has a rated power $P_r$, a maximum overload power $P_m$, and is operable along a multi-voltage droop slope, the multi-voltage droop slope including a share region and a catch region, the share region being defined by an upper voltage limit, $V_{high}$ and a base voltage $V_{base}$, and the catch region being defined by the base voltage $V_{base}$ and a lower voltage limit, $V_{low}$;
　and the method includes:
　　providing a scaling factor, K, for each of the sources of electrical power, the scaling factor operating on a process variable used to control an output of the respective source of electrical power in a control loop, such that the sources of electrical power operate on one of the share region and the catch region; and when a power demand of the electrical load is less than the sum of the rated powers $P_r$, setting one or more scaling factor K such that each source of electrical power is operating in the share region of the multi-voltage droop slope in which a power split between the sources of electrical power is equal to the ratio of $P_r$ for a given source of power to the sum of rated powers $P_r$ for the sources of electrical power; and when the power demand of the electrical load is greater than the sum of the rated powers $P_r$, setting one or more scaling factor K such that each source is operating in the catch region of the multi-voltage droop slope in which a power split between the sources of electrical power is equal to a ratio of $P_m$ for a given source of power to the sum of overload powers $P_m$ for the sources of electrical power.

Such a method allows for power sharing, whilst also accommodating safe transient overload. This is achieved by having each source of electrical power rated to a nominal power $P_r$, a maximum overload power $P_m$, and is operable along a multi-voltage droop slope, e.g. two slopes. The multi-voltage droop slope being defined by at least two regions, a share region and a catch region. The share region runs from $V_{high}$ to $V_{base}$ on the voltage scale and may run from 0 to $P_r/sf=P_b$ on the power scale where $sf \geq 1$ This implies that $P_b \leq P_r$ and thus the scaling factor is used to control load power contribution split between sources. The catch region has the slope running from $V_{base}$ to $V_{low}$ on the voltage scale and may run from $P_b$ to $P_m$ on the power scale, and therefore can be used to catch transient overload. The scaling factor, K relates to $sf$ by the equation $sf=K/K_r$, where $K_r=(V_{high}-V_{base})/I_r$. The scaling factors K (and therefore slope factors $sf$) are set such as to achieve the desired load power contribution split ratio, which will be the same as the ratio of the resulting base powers $P_b$. As long as the load power does not exceed the sum of all $P_b$, the system operates in the share region and the demanded load power contribution split is achieved (see e.g. FIG. 2). If the load power exceeds the sum of $P_b$, the system starts operating in the catch region (as the voltage droops down), which changes the droop slope angles, which results in progressive load share split change from the demanded split to the inherent split of $P_m$ (see e.g. FIG. 3), with the change being proportional to the amount of overload.

Such a method can be used to manage an instantaneous change in demand on the shared bus without the risk of pushing any given source of power over its maximum capability, mitigating the risk of hardware damage. The electrical power may be DC power. The DC voltage on the shared bus can also be maintained within a band, and power sharing may be controlled via an outer loop power management system. Further, in comparison to a master-slave arrangement, if any given source of power is lost or falls offline, the load is distributed across the remaining sources whilst minimising the risk of overload. The method also provides a solution to meeting the bus power quality requirements set by various international standards (e.g. MIL-STD-704F) for a multi-source electrical network.

The method may have any one or, to the extent that they are compatible, any combination of the following optional features.

The scaling factor may be a scaling function $f(K, I)$, where K is a control parameter relating to a split ratio contribution demand. The scaling factor K for each source of electrical power may be defined as $K=K_r \times sf$, where $K_r$ is set such that a transition point between the share region and the catch region of the multi-voltage droop slope for each source of power is at a value corresponding to the rated power for that source of electrical power, and $sf$ is a slope factor greater than or equal to 1.

The share region may be further defined as a region of the multi-voltage droop slope between 0 watts power output and the base power output $P_b=P_r/sf$, on the power scale.

The catch may be further defined as a region of the multi-voltage droop slope between the base power output $P_b=P_r/sf$ and the maximum power output $P_m$, on the power scale.

The share and catch regions may be further defined by a plurality of piecewise linear slopes, each with respective knee points. The knee points may have the values $(I_n, V_n)$ or $(P_n, V_n)$, where n is the $n^{th}$ piecewise linear slope. This can be extended to n=∞ such that the slopes become continuous functions.

When the sources of power are operating in the catch region of their respective multi-voltage droop slopes, a power manager control system may adjust the scaling factor of one or more sources of power so as to bring the sources of power operating in the catch region back into the share region.

A thermal state of each source of power may be monitored, and the maximum overload power $P_m$ of each source of power may be adjusted in accordance with the monitored thermal state of the respective source of power.

By doing so, the likelihood of overloading any given source can be significantly reduced.

The process variable used to control the output of the respective source of electrical power is an electrical current output $I_{DC}$ from that source to the shared bus.

The sources of electrical power may be turbines and the shared bus may be connected to one or more electrical engines for an aircraft. Alternatively the sources of electrical power may be turbines, and the shared bus may be connected to one or more electrical loads for a ship. The sources of electrical power may be electrical storage (e.g. batteries) or electrical machines (e.g. generators).

In a second aspect, embodiments of the present disclosure provide a power management controller, connected to two or more sources of electrical power configured to supply DC power to a shared bus, wherein:

each source of electrical power has a rated power $P_r$, a maximum overload power $P_m$, and is operable along a multi-voltage droop slope, the multi-voltage droop slope including a share region and a catch region, the share region being defined by an upper voltage limited, $V_{high}$ and a base voltage $V_{base}$, and the catch region being defined by the base voltage $V_{base}$ and a lower voltage limit $V_{low}$; and the power management controller is configured to perform the method of the first aspect.

In a third aspect, embodiments of the present disclosure provide an aircraft including:

two or more sources of electrical power, connected to a shared bus;

the power management controller of the second aspect; and one or more electric engines, for propelling the aircraft, connected to the shared bus and driven by the two or more sources of electrical power.

In a fourth aspect, embodiments of the present disclosure provide a ship including:

two or more sources of electrical power, connected to a shared bus;

the power management controller of the second aspect; and one or more electrical loads, connected to the shared bus and provided with power by the two or more sources of electrical power.

Further aspects of the present disclosure provide: a computer program comprising code which, when run on a computer, causes the computer to perform the method of the first aspect; a computer readable medium storing a computer program comprising code which, when run on a computer, causes the computer to perform the method of the first aspect; and a computer system programmed to perform the method of the first aspect.

DESCRIPTION OF THE DRAWINGS

Embodiments of the disclosure will now be described by way of example with reference to the accompanying drawings in which.

DETAILED DESCRIPTION

Aspects and embodiments of the present disclosure will now be discussed with reference to the accompanying figures. Further aspects and embodiments will be apparent to those skilled in the art.

Figure 1:
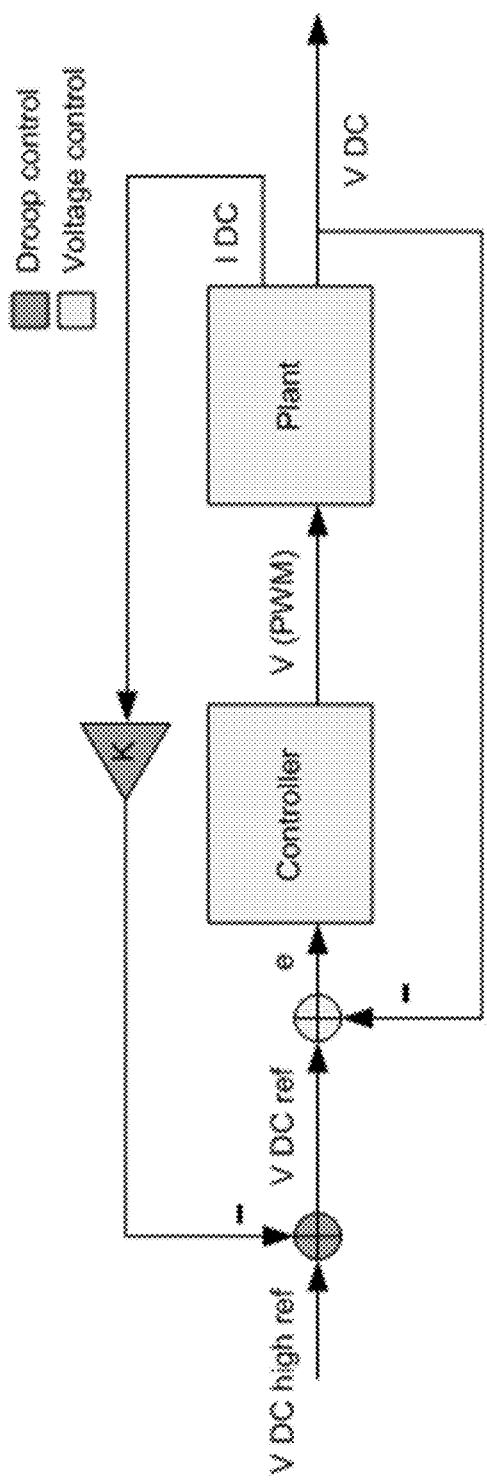
FIG. 1 shows a control scheme implementing voltage droop control.
Figure 2:
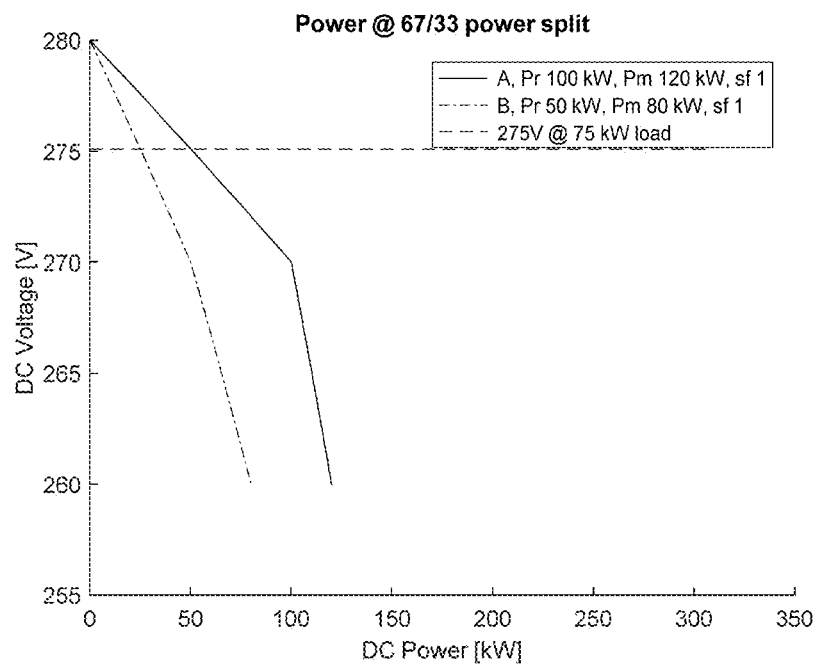
FIG. 2 is a plot of DC power against DC voltage illustrating the multi-voltage droop slopes of two sources of power operating in a share region.

FIG. 2 is a plot of DC power against DC voltage for two sources of power: A and B. Source A has a rated power $P_r$ of 100 kW, and a maximum overload power $P_m$ of 120 kW. Source B has a rated power $P_r$ of 50 kW, and an overload power $P_m$ of 80 kW. Both have a $V_{high}$, $V_{base}$, and $V_{low}$ set to 280 V, 270 V, and 260 V respectively.

Each source supplies power by following the multi-voltage droop slope shown. The share region, defined as the region between (0, $V_{high}$) to ($P_r$, $V_{base}$), is characterised by the inherent value of K, or gain. Therefore, subject to the load placed on the sources of power being below the sum of the rated values $P_r$, 50 kW+100 kW=150 kW in this example, both sources of power will work in the share region of their multi-voltage droop slopes. The power share split ratio is therefore defined by the contribution of all sources and so, on the share region, the split ratio is equal to the ratio of $P_r$ to the sum of both rated powers. In this example it is 67:33 or 67%/33% (rounded to the nearest whole number/percent).

Figure 3:
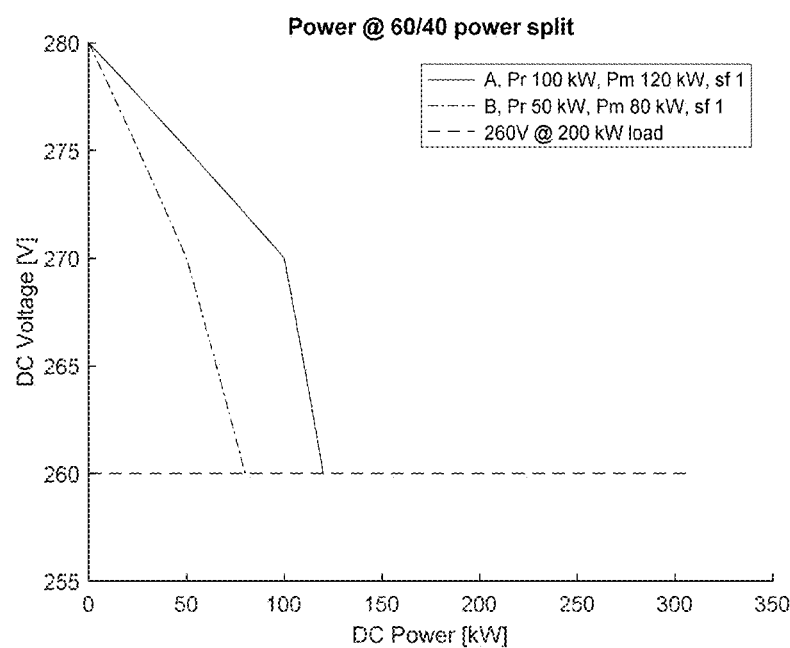
FIG. 3 is a plot of DC power against DC voltage illustrating the multi-voltage droop slopes of two sources of power operating in a catch region.

The full overload capacity in this example is 80 kW+120 kW=200 kW. When operating over the rated power output, the share split would be determined by the ratio of $P_m$ to the sum of both maximum overload powers, or 120/200 to 80/200 i.e. a 60:40 split. This is shown in FIG. 3, where both sources of power are operating in the catch regions of their respective multi-voltage droop slopes. The catch region is used to gradually transition the share split from the inherent ratio dictated by the rated powers to the inherent ratio of the maximum overload powers.

Advantageously, K may be redefined as $K=K_r \times sf$, where $K_r$ is the K needed to bring the knee point in the respective multi-voltage droop slope to the actual rated power $P_r$ of that source, and $sf$ is a slope factor greater or equal to 1. The value of $sf$ can be used to move the knee point to a virtual rated power: $P_b$ by making the share region steeper.

Figure 4:
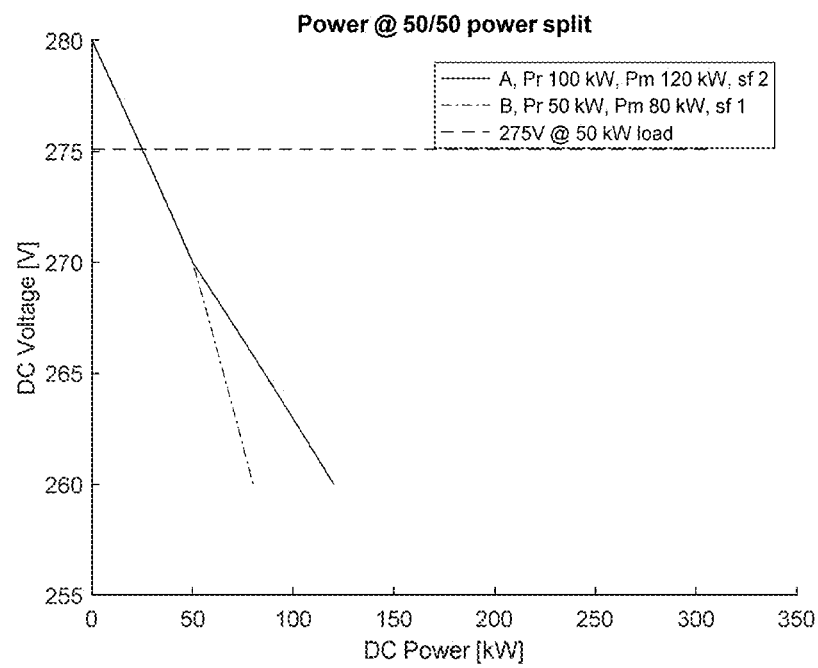
FIG. 4 is a plot of DC power against DC voltage illustrating the multi-voltage droop slopes of two sources of power operating in a share region.

Under such an operating scheme, if a 50:50 power split was demanded, the more powerful source, Source A in this example, would need to work on the same slope as Source B. This can be achieved by setting the slope factor of A to $P_{r_A}/P_{r_B}=2$. The virtual rated power of A, $P_{b_A}$ now equals 50 kW, which means that the 50:50 split cam be adhered to up to a $P_{b_A}+P_{r_B}=100$ kW load. This is shown in FIG. 4.

Figure 5:
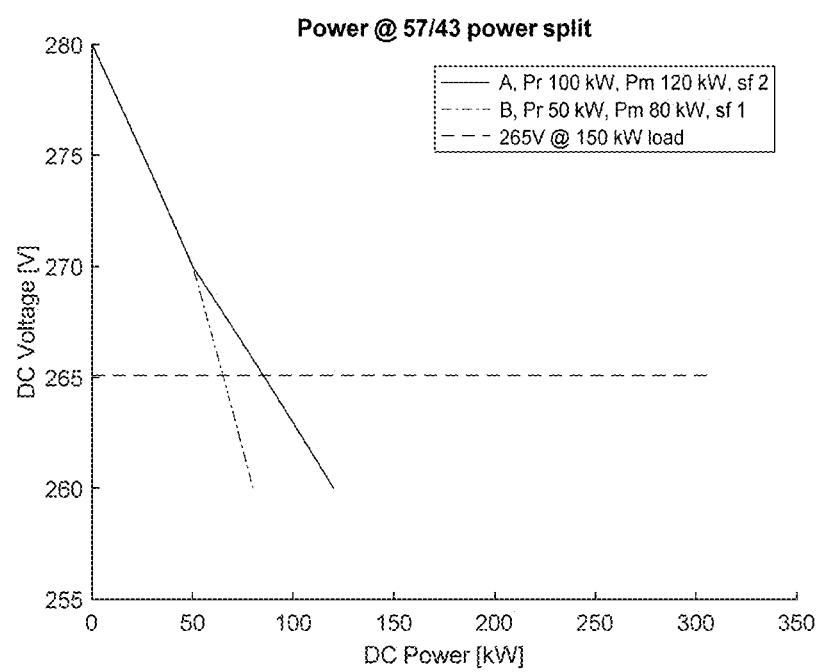
FIG. 5 is a plot of DC power against DC voltage illustrating the multi-voltage droop slopes of two sources of power operating in a catch region.

The system is capable of providing 150 kW continuously, at a 66.7:33.3 split, as shown before. Therefore it is possible for the load to be stepped up to 150 kW instantaneously. However, if a 50:50 split is demanded before this change in demand, a slower high level power manger needs to update the 50:50 split to the 66.7:33.3 split to meet this increase in demand. The temporary situation during the transient is handled by the catch region, as shown in FIG. 5, until the power manager adjusts the $sf$ values and brings each source power back into the share region of its respective multi-voltage droop slope.

The dual slope method aims to adhere as much as possible to the demanded split. The larger the overload beyond the knee point, the further the split deviates from the demanded split and starts to look more like the inherent overload capability split. Operation in the catch regions of the respective multi-voltage droop slopes is intended to be of a relatively short duration, until the slower power manager control system catches up and changes the split demands such that operation in the share regions is possible.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

The invention claimed is:

1. A method of controlling two or more sources of electrical power to supply electrical power to a shared bus for provision to an electrical load;

wherein each source of electrical power has a rated power $P_r$, a maximum overload power $P_m$, and is operable along a multi-voltage droop slope, the multi-voltage droop slope including a share region and a catch region, the share region being defined by an upper voltage limit, $V_{high}$ and a base voltage $V_{base}$, and the catch region being defined by the base voltage $V_{base}$ and a lower voltage limit, $V_{low}$;

and the method comprises:

providing a scaling factor, K, for each of the sources of electrical power, the scaling factor operating on a process variable used to control an output of the respective source of electrical power in a control loop, such that the sources of electrical power operate on one of the share region and the catch region; and when a power demand of the electrical load is less than the sum of the rated powers $P_r$, setting one or more scaling factor K such that each source of electrical power is operating in the share region of the multi-voltage droop slope in which a power split between the sources of electrical power is equal to the ratio of $P_r$ for a given source of power to the sum of rated powers $P_r$ for the sources of electrical power; and when the power demand of the electrical load is greater than the sum of the rated powers $P_r$, setting one or more scaling factor K such that each source is operating in the catch region of the multi-voltage droop slope in which a power split between the sources of electrical power is equal to a ratio of $P_m$ for a given source of power to the sum of overload powers $P_m$ for the sources of electrical power.

2. The method of claim 1, wherein the scaling factor K for each source of electrical power is defined as $K=K_r \times sf$, where $K_r$ is set such that a transition point between the share region and the catch region of the multi-voltage droop slope for each source of power is at a value corresponding to the rated power for that source of electrical power, and $sf$ is a slope factor greater than or equal to 1.

3. The method of claim 2, wherein the share region is further defined as a region of the multi-voltage droop slope between 0 watts power output and a base power output $P_b=P_r/sf$, on the power scale.

4. The method of claim 1, wherein the catch region is further defined as a region of the multi-voltage droop slope between the base power output $P_b=P_r/sf$ and the maximum power output $P_m$, on the power scale.

5. The method of claim 1, where the share and catch regions are further defined by a plurality of piecewise linear slopes, each with respective knee points.

6. The method of claim 1, wherein when the sources of power are operating in the catch region of their respective multi-voltage droop slope, a power manager control system adjusts the scaling factor of one or more sources of power so as to bring the sources of power operating in the catch region back into the share region.

7. The method of claim 1, wherein a thermal state of each source of power is monitored, and wherein the maximum overload power $P_m$ of each source of power is adjusted in accordance with the monitored thermal state of the respective source of power.

8. The method of claim 1, wherein the process variable used to control the output of the respective source of electrical power is an electrical current output to the shared bus $I_{DC}$.

9. The method of claim 1, wherein the two or more sources of electrical power are turbines, and the shared bus is connected to one or more electrical engines for an aircraft.

10. A power management controller, connected to two or more sources of electrical power configured to supply DC power to a shared bus, wherein:

each source of electrical power has a rated power $P_r$, a maximum overload power $P_m$, and is operable along a multi-voltage droop slope, the multi-voltage droop slope including a share region and a catch region, the share region being defined by an upper voltage limited, $V_{high}$ and a base voltage $V_{base}$, and the catch region being defined by the base voltage $V_{base}$ and a lower voltage limit $V_{low}$; and the power management controller is configured to perform the method of claim 1.

11. An aircraft, including:

two or more sources of electrical power, connected to a shared bus;

the power management controller of claim 10; and one or more electric engines, for propelling the aircraft, connected to the shared bus and driven by the two or more sources of electrical power.

12. A ship, including:

two or more sources of electrical power, connected to a shared bus;

the power management controller of claim 10; and one or more electric loads, connected to the shared bus and provided with power by the two or more sources of electrical power.

13. A non-transitory computer readable medium comprising instructions which, when executed by a power management controller configured to control two or more sources of electrical power to supply electrical power to a shared bus for provision to an electrical load, causes the power management controller to perform the method of claim 1.

* * * * *